United States Patent [19]

Kitagawa

[11] Patent Number: 4,457,482

[45] Date of Patent: * Jul. 3, 1984

[54] FLAT CABLE CLAMP

[75] Inventor: Hiroji Kitagawa, Nagoya, Japan

[73] Assignee: Kitagawa Industries Co., Ltd., Nagoya, Japan

[*] Notice: The portion of the term of this patent subsequent to Apr. 20, 1999 has been disclaimed.

[21] Appl. No.: 204,354

[22] Filed: Nov. 5, 1980

Related U.S. Application Data

[63] Continuation of Ser. No. 110,018, Jan. 7, 1980, Pat. No. 4,325,526.

[30] Foreign Application Priority Data

Jan. 23, 1979 [JP] Japan ............... 54-7348[U]

[51] Int. Cl.³ .................................. F16L 3/08
[52] U.S. Cl. ...................... 248/74.3; 248/73
[58] Field of Search ............. 248/74 PB, 73, 74 A, 248/74 B; 24/248 B, 250, 255 SL, 249 R, 254, 16 PB

[56] References Cited

U.S. PATENT DOCUMENTS

| | | | |
|---|---|---|---|
| 3,421,187 | 1/1969 | Ryder | 248/74 PB |
| 3,500,505 | 3/1970 | Thompson | 248/74 PB X |
| 3,637,177 | 1/1972 | Santucci | 248/74 PB |
| 3,874,042 | 4/1975 | Eddleman | 24/255 SL |
| 3,913,187 | 10/1975 | Okuda | 24/255 SL |
| 4,212,303 | 7/1980 | Nolan | 24/248 B X |
| 4,221,352 | 9/1980 | Caveney | 248/74 PB |

FOREIGN PATENT DOCUMENTS 1030601 1/1957 Fed. Rep. of Germany ........ 24/250

Primary Examiner—J. Franklin Foss
Attorney, Agent, or Firm—Wegner & Bretschneider

[57] ABSTRACT

A flat cable clamp for mounting a desired number of piled flat cables. The clamp is provided with a contact board formed integral with the clamp body and to be brought into contact with the top flat cable. The contact board can be resiliently displaced via resilient members in the repulsive direction of the flat cables.

6 Claims, 14 Drawing Figures

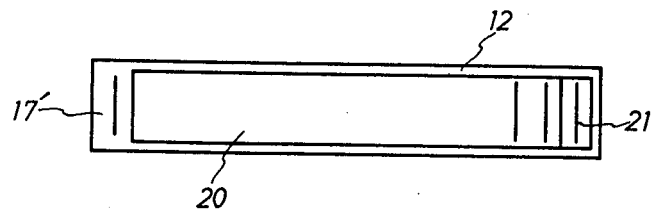
Fig. 3
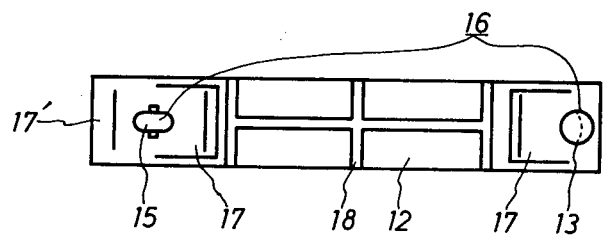
Fig. 4
Fig. 5
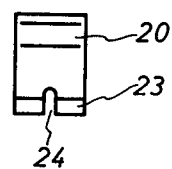
Fig. 6
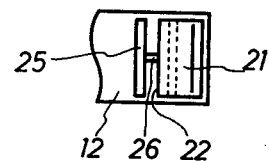
Fig. 7
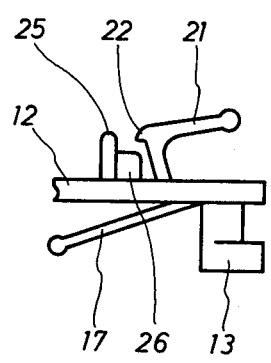
Fig. 8
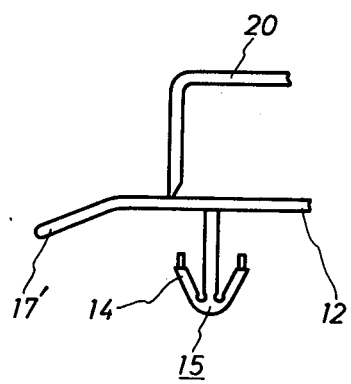

FLAT CABLE CLAMP

This application is a continuation of application Ser. No. 110,018 filed Jan. 7, 1980, now U.S. Pat. No. 4,325,526.

BACKGROUND OF THE INVENTION (1) Field of the Invention

The present invention relates to a flat cable clamp which can easily and efficiently retain either a single flat cable or a plurality of piled flat cables.

(2) Description of the Invention

Heretofore, there has been typically employed a type of cable clamp 1 as shown in FIG. 1. Said clamp 1 comprises a synthetic resin base board 3 the longitudinal direction of which complies to the transverse direction W of a bundle of flat cables 2, an arrow-shaped protrusion 4 formed integral with the back of the base board 3 for securing the base board 3 to a supporting board for distributing wires and a press board 9 formed integral with the top surface of the base board 3 at one of the longitudinal ends thereof, which can be engaged and disengaged with the other longitudinal end of the base board 3 via a locking mechanism 8 which consists of an unlock lever 5 and engaging hooks 6 and 7.

Therefore, in such case, since the necessary height H of an inserting channel 10 provided for mounting cables and defined by the base board 3 and the press board 9 varies depending on the number of flat cables to be mounted, it is necessary to prepare at least as many number of flat cable clamps 1 as required so as to give the fitting with the flat cables in a certain height and furthermore, in reality, since the width W of the flat cable 2 can vary depending on the particular flat cable in use, the number of necessary flat cable clamps having different shapes in the term of width is increased, thus reducing the productivity of clamps, which then increases the production cost and hence the wiring cost, and further complicates wiring operation, resulting in reduction in efficiency of such operation.

SUMMARY OF THE INVENTION

As a result of my intensive study to overcome the above problems, I have discovered that the use of a flat cable clamp having a structure similar to that of a pantograph enables flat cables to be easily and securely clamped irrespective of their number, thickness etc.

Accordingly, the object of the present invention is to eliminate the afore-mentioned drawbacks by providing a flat cable clamp which can clamp any number of flat cables.

BRIEF DESCRIPTION OF THE DRAWING

FIG. 3 and FIG. 4 are a top view and a bottom view of the flat cable clamp illustrated in FIG. 2, respectively;

FIG. 5 and FIG. 6 are views of the flat cable clamp illustrated in FIG. 2, observed in the directions A and B, respectively;

FIG. 7 and FIG. 8 are detailed partial views of the parts C and D of the flat cable clamp illustrated in FIG. 2, respectively;

DESCRIPTION OF THE PREFERRED EMBODIMENT

One embodiment of the present invention will be described with reference to FIGS. 2-11.

Figure 2:
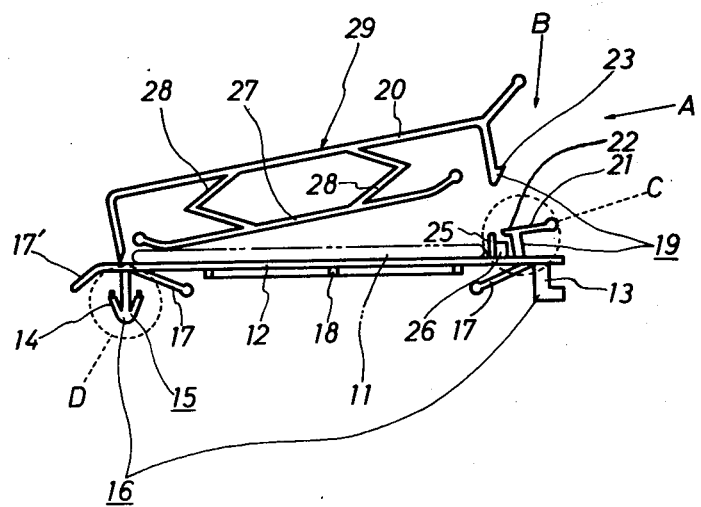
FIG. 2 is a front view of a flat cable clamp in accordance with the present invention, which is shown as the unclamped state.
Figure 9:
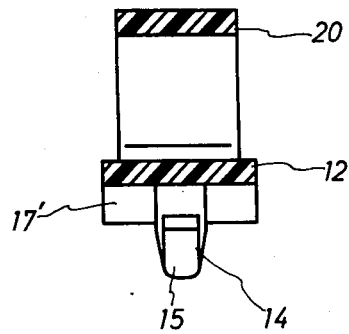
FIG. 9 is a right side view of the illustration of FIG. 8.
Figure 10:
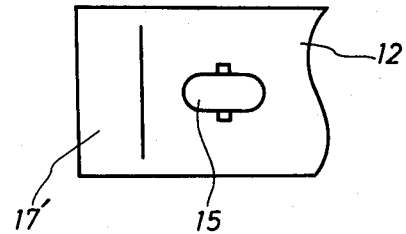
FIG. 10 is a bottom view of the illustration of FIG. 8.

Referring to FIG. 2, a synthetic resin base board 12 the longitudinal direction of which complies to the transverse direction of flat cables 11 is provided and formed integral with a protrusion 13 on the bottom at one end and with an arrow-shaped protrusion 15 on the bottom at the other end. The protrusion 13 has a dent to be engaged with one fitting hole on a supporting board for distributing wires (not shown) and the arrow-shaped protrusion 15 has a resilient arrow-shaped member 14 to be engaged with the other fitting hole on the supporting board for distributing wires, so that the combination of the protrusions 13 and 15 constitutes an instantly engaging means 16. The base board 12 is further provided on the bottom surface with resilient flaps 17 and 17' together with a reinforcing rib 18 in order to eliminate the looseness between the supporting board for distributing wires and the base board 12.

Figure 11:
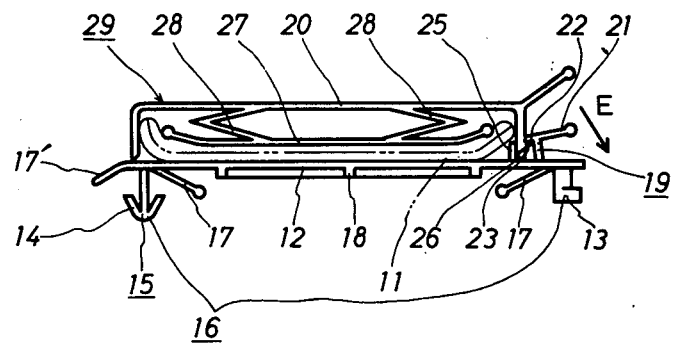
FIG. 11 is a front view of the flat cable clamp illustrated in FIG. 2, which is shown as the clamped state.

On the top surface of the base board 12, there is provided and integrated with the base board 12 a press board 20 which is rockingly movable by being connected with one of the longitudinal ends of the base board 12 by a hinge and can be engaged and disengaged with the other longitudinal end via a locking mechanism 19. As shown in FIG. 11, where the base board 12 and the press board 20 are in the locked state, when an unlock lever 21 is pressed down in the direction R as in the Figure, an engaging hook 22 at the tip of the unlock lever 21 is released from the engagement with an engaging hook 23 at the tip of the press board 20, which will immediately jump up to the position as shown in FIG. 2.

In the locked (i.e. clamped) state where the hooks 22 and 23 of the press board 20 and the unlock lever 21 are engaged, as particularly shown in FIGS. 5 and 6, a channel 24 at the tip of the press board 20 is engaged with a stopper 26 protrudingly provided on a guide wall 25 on the base board 12 which receives the inner side of the tip portion of the press board 20, thus preventing the transverse slippage of the press board 20, i.e., keeping the press board 20 from the movement in the longitudinal direction of the flat cables 11.

On the inner surface of the press board 20 facing to the top surface of the base board 12, there is provided a contact board 27 in combination with resilient members 28 formed integral with the press board 20, and the contact board can be resiliently displaced via said resilient members in the repulsive direction of the flat cables 11 mounted on the base board 12 and brought into contact with the contact board 27.

Now, the mode of application of the flat cable clamp described above will be explained in details.

When wiring is carried out simultaneously with clamping the flat cables 11 with a flat cable clamp 29 having the structure described above, the protrusions 13 and 15 are inserted into the fitting holes on the supporting board for distributing wires to instantly secure the clamp 29 to the supporting board, and at the same time, the flat cables 11 are mounted on the base board 12 in the unlocked state and the press board 20 is locked with the base board 12 via the locking mechanism 19. Thus, the flat cables 11 are clamped between the base board 12 and the contact board 27 by the resilience of the resilient members 28. Even when the number of the piled flat cables mounted on the clamps is increased, the position of the contact board 27 can easily be raised using its resiliency imparted by the resilient members 28, and therefore, any number of flat cables within the movable distance of the contact board 27 can be clamped. In addition, in the case where a flat cable having a width greater than that of the contact board 27 is to be clamped, it can be smoothly clamped in the modestly curved state along the sloped surfaces at both ends of the contact board 27 as shown in FIG. 11, and thus the damage to the cable itself is advantageously avoided.

Figure 1:
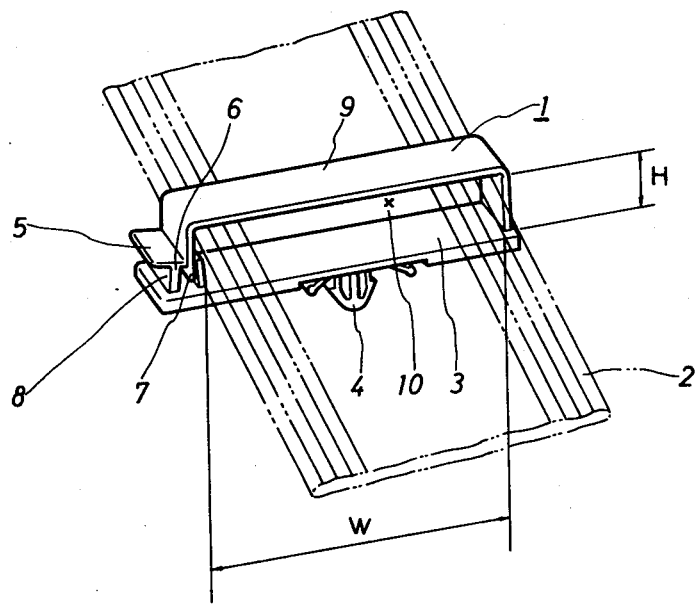
FIG. 1 is a perspective view of the conventional type of flat cable clamp.

It will be appreciated by those skilled in the art that the instantly engaging means 16 employed in the particular example described above may be replaced by other means, e.g., the one presented in FIG. 1 as the conventional embodiment, that coated with an adhesive or the like, and that the external shape of the clamp 29 may be modified according to the shapes of the supporting board for distributing wires and the flat cables and the like.

Figure 12:
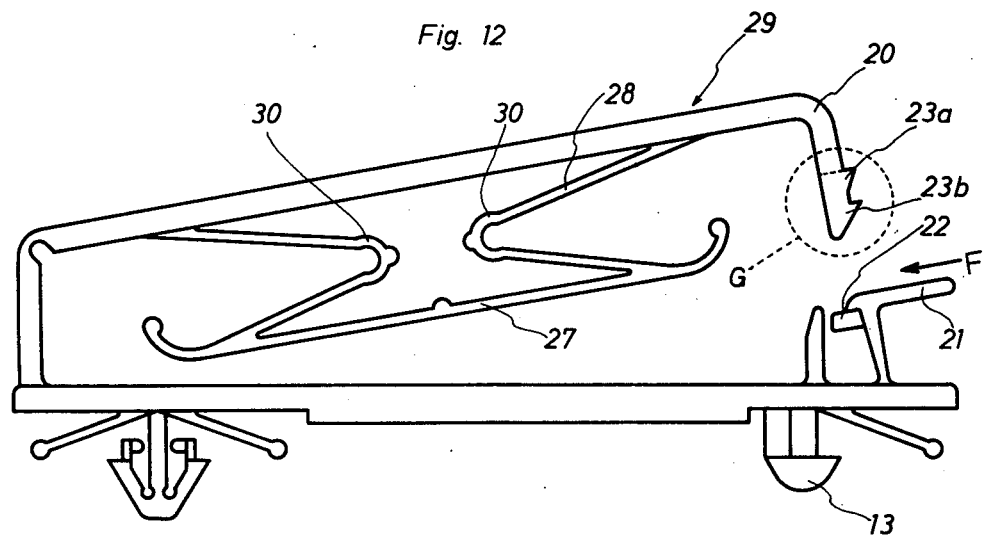
FIG. 12 is a front view of another flat cable clamp in accordance with the present invention, which is shown as the unclamped state.
Figure 13:
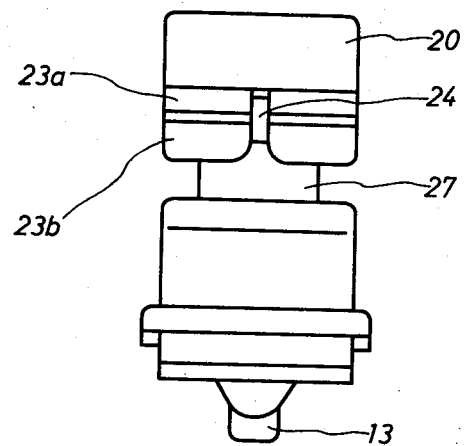
FIG. 13 is a view of the flat cable clamp illustrated in FIG. 12, observed in the direction F.
Figure 14:
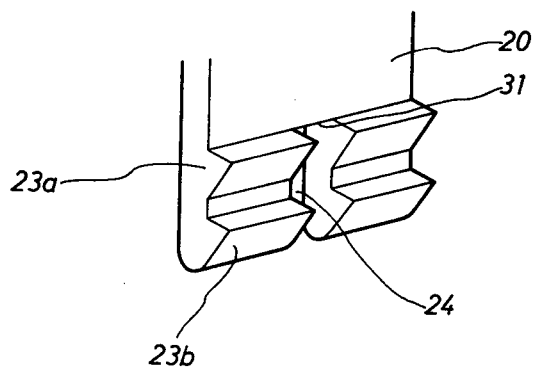
FIG. 14 is a perspective view showing the details of the part G of the flat cable clamp illustrated in FIG. 12.

FIGS. 12 to 14 present another embodiment of the present invention, in which the pantograph-shaped resilient members 28 are provided with semi-circular connecting parts 30 at the respective turns, thus giving more smooth displacement of the contact board 27. In addition, a bigger engaging hook 22 is used at the tip of the unlock lever 21 and when the unlock lever 21 is pressed down, the engaging hook 22 hits the bottom 31 of the channel 24 at the tip of the press board 20 to lift it, thus easily effecting the clamp-off operation. Advantageously, the hook 23 at the tip of the press board 20 is constructed to have a double stage as shown in FIG. 14, and therefore, it is possible to choose between the upper hook 23a and the lower hook 23b depending on the height of cables to be mounted. Further, the protrusion for engaging with the supporting board for distributing wires 13 is changed into the one shown in FIG. 12, thus preventing the whole clamp 29 from warping.

The material for the structure in accordance with the present invention is not critical as long as it does not interfere the mechanism of the clamp, and those skilled in the art will readily select appropriate materials for making the same.

The above description has been presented for the purpose of enabling those skilled in the art to practice the present invention and has not attempted to describe all the possible modifications and variations of the invention which will become apparent to those skilled in the art upon reading this disclosure. It is intended, however, that all such modifications and variations be included within the scope of the present invention which is defined by the following claims.

What I claim is:

1. A flat cable clamp, comprising:
   a base board having two ends;
   a rockingly movable press board for clamping a flat cable to said base board, said press board formed integrally with said base board at one end thereof and having an engaging hook at the other end thereof;
   means for locking said base board to said press board, including
   said engaging hook,
   an unlock lever, and
   an opposing engaging hook disposed at the engaging tip of said unlock lever, the unlock lever and its engaging hook being formed integrally with the base board at said other end;
   said press board presenting an open channel at its tip; and
   a tab protruding from the engaging hook at the tip of said unlock lever and adapted for cooperative engagement with said channel in the locked state and for exerting a pressure on the tip of said press board at the bottom of said channel during unclamping.

2. The clamp for flat cables according to claim 1 in which the engaging hook at the end of the press board is provided as a plurality of stages.

3. The flat cable clamp of claim 1 wherein said press board includes a resilient contact board formed integrally therewith for biasing the flat cable against said base board.

4. The flat cable clamp of claim 3 wherein the biasing portion of said resilient contact board is in the form of a pantograph.

5. The flat cable clamp of claim 1, including a guide wall extending outwardly from the base board for separating the cable to be clamped from said locking means.

6. A flat cable clamp, comprising
   a base board having two ends;
   a rockingly movable press board for clamping a flat cable to said base board, said press board formed integrally with said base board at one end thereof and having an engaging hook at the other end thereof;
   means for locking said base board to said press board, including
   said engaging hook,
   an unlock lever, and
   an opposing engaging hook disposed at the engaging tip of said unlock lever, the unlock lever and its engaging hook being formed integrally with the base board at said other end;
   said press board presenting an open channel at its tip; and
   a tab protruding from said base board and adapted for cooperative engagement with said channel in the locked state.

* * * * *